June 25, 1968 A. J. LUSCOMBE 3,389,609
POWER TRANSMISSION SYSTEM FOR TRACTOR POWERED IMPLEMENTS
Filed April 28, 1967 2 Sheets-Sheet 2

INVENTOR.
ARTHUR J. LUSCOMBE
BY
Williamson, Palmatier
& Bains ATTORNEYS

United States Patent Office 3,389,609
Patented June 25, 1968

3,389,609
POWER TRANSMISSION SYSTEM FOR TRACTOR POWERED IMPLEMENTS
Arthur J. Luscombe, Armstrong, Iowa 50514
Filed Apr. 28, 1967, Ser. No. 634,559
4 Claims. (Cl. 74—15.2)

ABSTRACT OF THE DISCLOSURE

A mobile feed mixer has a pair of input driven shafts, each being differently splined and each shaft being connectible to only one of the sockets of a power takeoff shaft. The power takeoff shaft also has its sockets differently splined to fit either of the differently splined power takeoff shafts of commercial tractors. One of the splined conventional power takeoff output shafts revolves at approximately 540 r.p.m., and the other splined conventional power takeoff output shaft revolves at approximately 1,000 r.p.m. The power takeoff shaft requires the user to turn the shaft end for end when used with different power takeoff output shafts.

---

This invention relates to a wheeled implement of the type which is towed by a tractor and more specifically to the drive transmission between the tractor and an implement, such as a feed mixer, which drive transmission drives the various components of the implement.

An object of this invention is to provide an implement, such as a feed mixer, with a novel drive transmission, which is selectively connectible to either of the conventional power takeoff output shafts of commercial tractors, thus permitting an implement to be towed and driven by most commercially available tractors.

Another object of this invention is to provide a mobile towed implement, such as a feed mixer, with a pair of differently splined input driven shafts, each being selectively connectible to only one socket end of a power takeoff shaft, which in turn is adapted to be selectively connected to either of the output shafts of most of the commercial tractors upon turning the power takeoff shaft end for end, thus permitting the wheeled implement to be used with and driven by most tractors but precluding improper connection of the input shaft of the implement to the power takeoff output shaft of the tractor.

These and other objects and advantages of this invention will more fully appear from the following description made in connection with the accompanying drawings wherein like reference characters refer to the same or similar parts throughout the several views, and in which.

Figure 1:
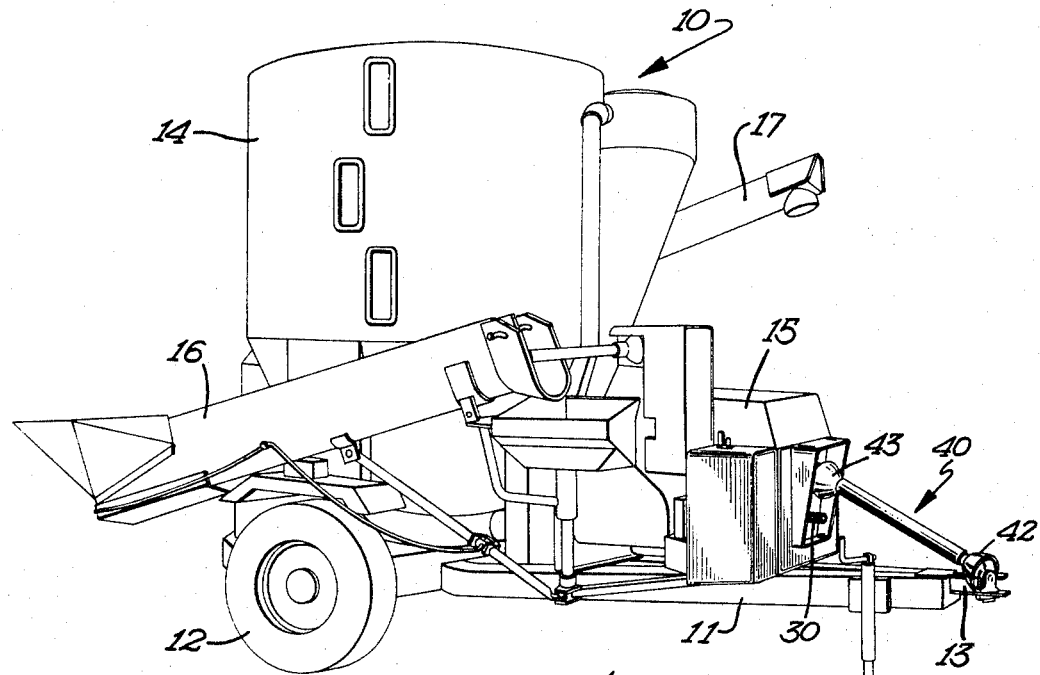
FIG. 1 is a perspective view of a mobile feed mixer which incorporates the novel transmission device.

Referring now to the drawings and more specifically to FIG. 1, it will be seen that mobile feed mixing apparatus 10 is there shown, which incorporates the novel drive transmission system that constitutes the present invention. The mobile feed mixing apparatus 10 is of a construction well known in the art and is adapted to be towed by a tractor and includes several components which are driven from the power takeoff of the tractor. The mobile feed mixing apparatus 10 includes a frame or chassis 11 having a pair of ground engaging wheels 12 to support the frame for travel over the surface of the ground. A clevis-type hitch 13 is secured to the front of the frame 11 and serves to provide a suitable coupling means for connection to the tractor. A mixing hopper 14 is mounted on the frame 11 and has a vertically disposed mixing auger (not shown) positioned therein.

The mobile feed mixing apparatus also includes a hammer mill 15, a loading auger 16, and an unloading auger 17, all of which are driven from the power takeoff of the tractor. The mobile feed mixing apparatus heretofore described is well known in the art and in the conventional commercially available feed mixers, the various components thereof, which are driven, are drivingly connected to the input shaft of the feed mixer, which in turn is connected by a power takeoff transmission shaft to the output power takeoff shaft of the tractor. The power takeoff transmission shaft of these conventional feed mixers is adapted for connection only with the power takeoff shaft of a tractor which revolves at approximately 540 r.p.m. These commercially available feed mixers, however, are not adapted for connection with that power takeoff shaft of tractors which revolve at approximately 1,000 r.p.m.

Figure 2:
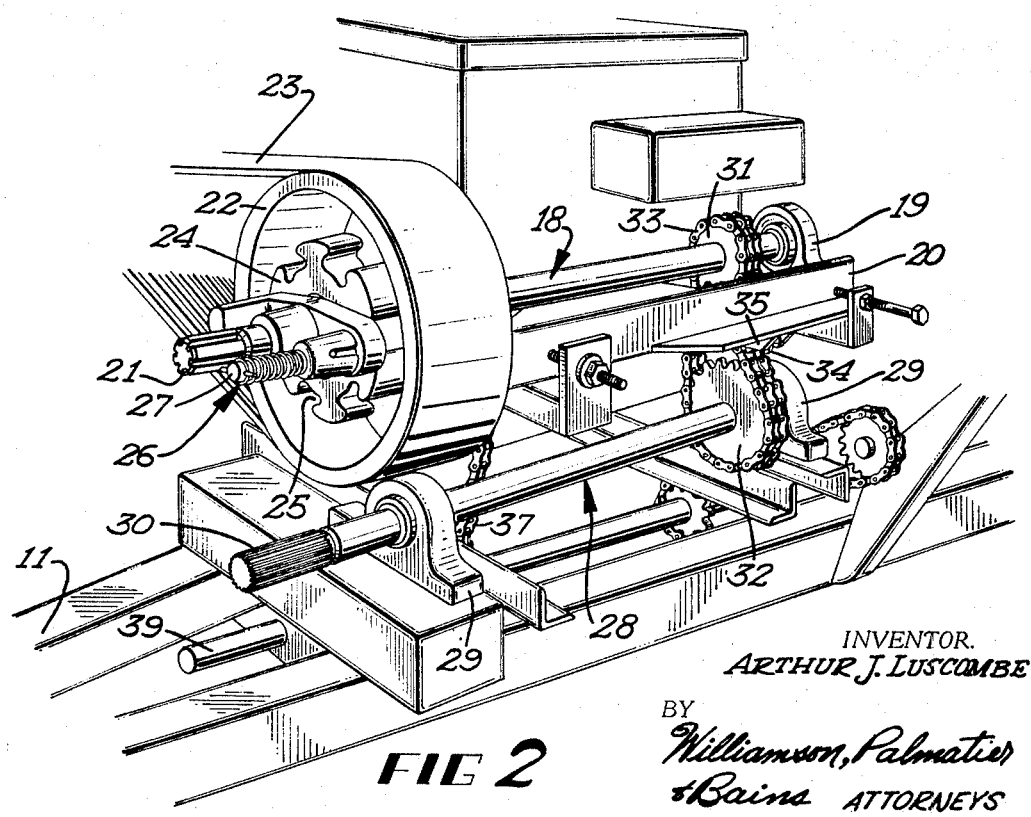
FIG. 2 is a fragmentary perspective view on an enlarged scale of a portion of the feed mixer apparatus illustrating some of the components of the novel transmission system.
Figure 4:
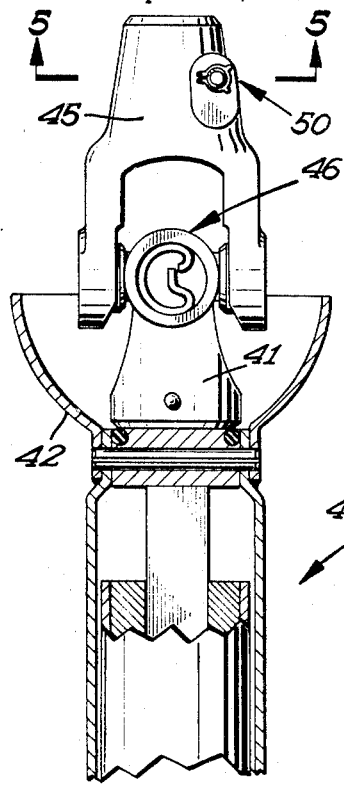
FIG. 4 is a side view on an enlarged scale of the power takeoff transmission shaft assembly.
Figure 4:
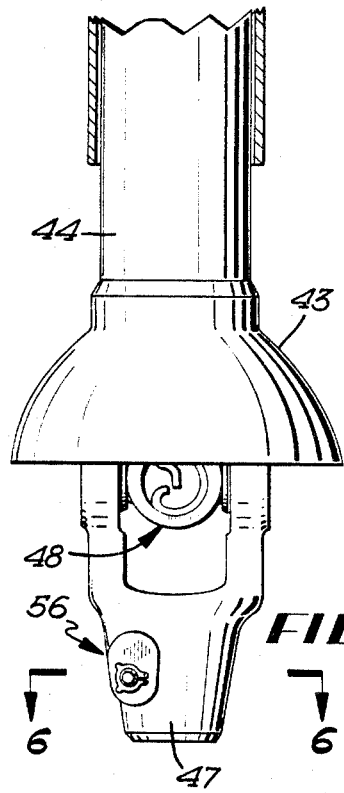
Figure 3:
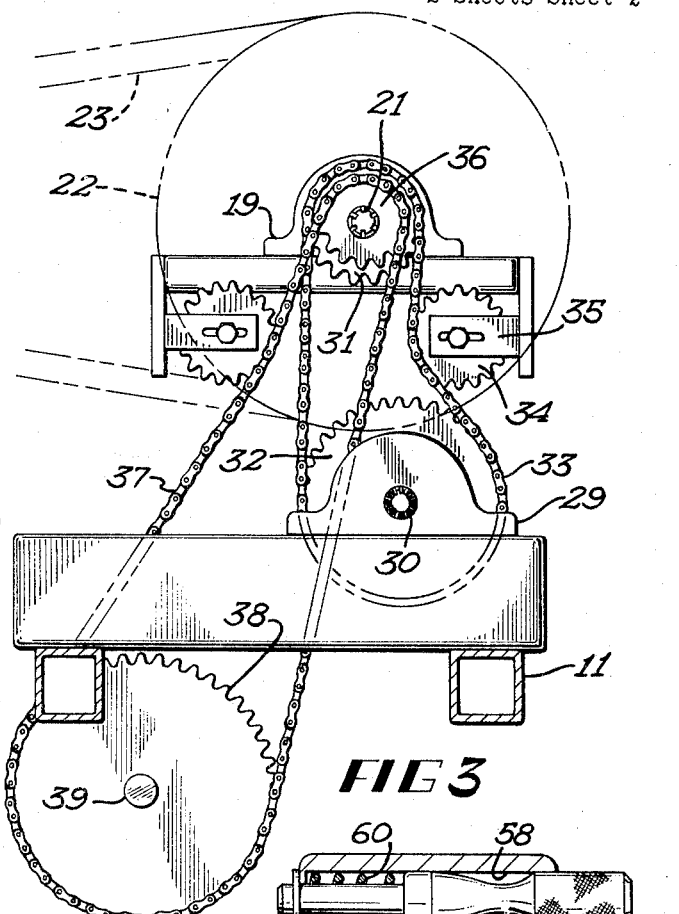
FIG. 3 is a diagrammatic front elevational view of certain of the components of the drive transmission.

Referring now to FIGS. 2 and 3, it will be seen that the mobile feed mixing apparatus includes a first input driven shaft 18, which has its end portions journalled in suitable pillow bearings 19, which in turn are mounted on a frame member 20 carried by the frame 11. It will be noted, that this first input driven shaft 18 extends in a fore and aft direction with respect to the frame 11 and is horizontally oriented adjacent the front end of the frame. The front end of the input driven shafts 18 has a plurality of splines 21 formed thereon, which extend axially thereof. In the embodiments shown, the driven shaft 18 has six such splines formed thereon, which correspond to the number of splines on the power takeoff output shaft of a conventional tractor which PTO revolves at approximately 540 r.p.m.

The shaft 18 also has a relatively large multiple groove pulley 22 freely revolvable thereon, the pulley having a multiple endless drive belt 23 trained therearound, which is also trained around a smaller driven pulley of the hammer mill 15. This drive pulley 22 includes a notched hub 24, which has a plurality of similar notches 25 therein. A clutch mechanism 26 of well known construction is keyed to the input shaft 18 and includes a spring urged plunger 27, which may be selectively engaged in one of the notches 25 of the hub 24 to selectively lock the pulley 22 to the input shaft 18 or to unlock the same therefrom to permit movement therebetween. It will be noted, that when the pulley 22 is locked to the shaft 18 for revolving movement therewith, there will be an increase in the drive from the shaft to the hammer mill.

The novel drive transmission also includes a second input driven shaft, which has its ends mounted in suitable pillow bearings 29 carried by the frame 11. It will be noted that the second input driven shaft 28 extends longitudinally of the frame 11 and is disposed at a slightly lower level than the first input driven shaft but is parallel thereto. In the embodiments shown, there are 21 axially extending splines 30 on the front end of the shaft 28 and this corresponds to the number and configuration of splines on the power takeoff output shaft of tractors, which PTO shaft revolves at approximately 1,000 r.p.m.

Referring again to FIG. 2, it will be noted that the first input driven shaft 18 has small gang sprockets 31 keyed thereto for rotation therewith, while the second input driven shaft 28 has larger gang sprockets 32 keyed thereto for rotation therewith. Endless chains 33 are trained around these gang sprockets and also around an idler sprocket 34, which is carried by a bracket 35 which is adjustably mounted on the frame member 20. It will therefore be seen that the first and second input driven shafts will be simultaneously driven, but at different speeds. In the embodiment shown, the ratio of drive between the gang sprockets is approximately 2:1 so that when the second input driven shaft 28 is being revolved at approximately 540 r.p.m., the first input driven shaft will be revolved at approximately 1,000 r.p.m.

Referring again to FIGS. 2 and 3, it will be seen that the first input driven shaft 18 has a small sprocket 36 keyed thereto for rotation therewith about which an endless drive chain 37 is trained. This drive chain is also trained about a larger driven sprocket 38, which is keyed to a driven shaft 39 mounted in suitable bearings carried by the frame 11 and extending longitudinally of the frame in a fore and aft direction. This shaft 39 provides the drive to the mixing auger in the mixing hopper 14 and also provides the drive for the unloading auger of the apparatus. This driven shaft 39 also provides drive to other components of the mobile feed mixing apparatus and it will therefore be noted that drive to all the components of the apparatus is transmitted from the first input shaft 18.

Referring now to FIGS. 1, 4, 5 and 6, it will be seen that a power takeoff transmission shaft assembly 40 is provided, which drivingly interconnects the implement to the power takeoff output shaft of a tractor. This assembly includes a shaft 41, which is of tubular construction and which is revolvable in a tubular shield 42. The tubular shield 42 telescopically engages a second tubular shield 43 in which is disposed a second shaft 44. The shaft 44 is also of tubular construction and is revolvable in the shield 43 but is keyed to the shield for axial movement therewith. A generally square shaped shaft element (not shown) is secured to the shaft 44 and extends telescopically into the shaft 41, so that the shafts, while being keyed to each other for revolving movement have a common drive and are telescopically extensible and retractable in the manner of the shields associated with the shafts.

Shaft 41 is connected to a socket member 45 by a universal coupling 46. A socket member 47 is connected to the shaft 44 by a universal coupling connection 48 in a well known manner. Thus, it wil be seen that the power takeoff transmission shaft assembly is longitudinally extensible and retractable and is of well known construction in the art.

Figure 5:
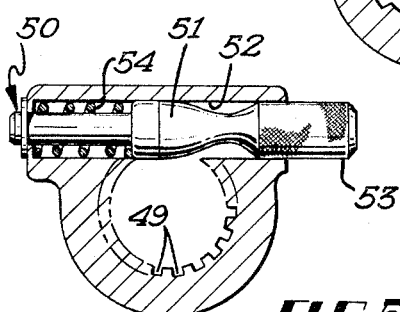
FIG. 5 is a cross-sectional view on an enlarged scale taken approximately along line 5—5 of FIG. 4 and looking in the direction of the arrows.

Referring now to FIG. 5, it will be seen that the socket member 45 is internally splined as at 49, and in the embodiment shown, is adapted to matingly engage the splined end of the second input driven shaft 28. A suitable spring urged locking plunger mechanism 50 is also provided for locking the socket to the splined end of a shaft. This locking mechanism 50 is of well known construction and includes a plunger 51, which extends into a bore 52 formed in the socket member 45. The plunger 51 has a finger engaging portion 53, which projects exteriorly of the bore and a helical spring 54 is disposed around a reduced end of the plunger and bears against a shoulder thereof to normally urge the plunger against inward rectilinear movement.

Figure 6:
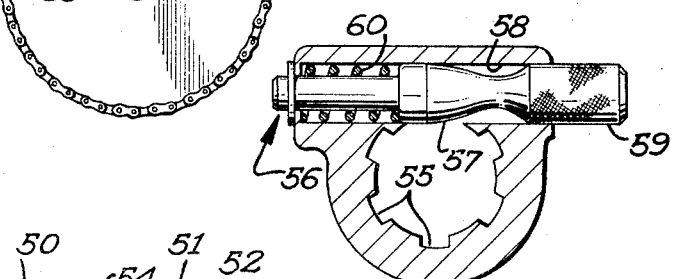
FIG. 6 is a cross-sectional view taken approximately along line 6—6 of FIG. 4 and looking in the direction of the arrows.

The inner spline configuration of the socket member 45 is also adapted to matingly engage the splined power takeoff output shaft of a conventional tractor, which has 21 splines and which revolves at approximately 1,000 r.p.m.'s. Referring now to FIG. 6, it will be seen that the socket member 47 also has internal splines 55 therein, which are adapted to matingly engage the first driven input shaft 18 and to also matingly engage the splined output power takeoff shaft of a conventional size tractor, which revolves at approximately 540 r.p.m. The socket member 47 also includes a locking mechanism 56 comprised of a plunger 57, which is movable in a bore 58 formed in the socket engaging member 47. The plunger 57 includes a finger engaging portion, which is normally urged downwardly by a spring 60, the latter embracing a reduced end of the plunger 57.

In use, if it is desirable to drive the mobile feed mixing apparatus 10 from a conventional tractor, the socket member 47 will be locked into mating engagement with the splined power takeoff output shaft of the tractor. The socket member 45 will be locked in engaging relation with the forward spline end of the second output driven shaft 28 so that drive will be transmitted through the shaft 28 to the shaft 18. Shaft 18 will be revolved at approximately 1,000 r.p.m., because of the speed transmission driving connection between the shafts 28 and 18.

In the event that the apparatus is connected for drive to a power takeoff output shaft of a larger size tractor, which revolves at approximately 1,000 r.p.m., the socket member 45 will be locked into mating engagement with this faster revolving PTO shaft. The socket member 47 will be locked in mating engagement with the front splined end of the first input driven shaft 18, so that the drive to all the components of the mixer will be directly from the shaft 18. Again, it will be noted that shaft 18 will be revolved at approximately 1,000 r.p.m. when directly driven from the faster driven PTO or a tractor. It will therefore be seen that in use, it is necessary to turn the power takeoff drive transmission shaft end for end when using the same with different power takeoff shafts of conventional tractors. The very construction of this drive transmission shaft precludes a user from interconnecting the power takeoff of a tractor to the wrong input shaft on the driven implement. It will be appreciated that in the event that the hammer mill was driven at approximately twice its normal operating speed, there would be a likelihood of damage to the components thereof.

Although the drive transmission system illustrated has been shown in conjunction with a feed mixing apparatus, it is pointed out that this drive transmission system can also be used in conjunction with other towed-type implements which utilize the power takeoff of a tractor as a source of power for the various driven components thereof.

From the foregoing description, it will be seen that I have provided a novel drive transmission system for towed-type mobile instruments having a plurality of driven components, which may be driven by either the faster driven power takeoff shaft or the slower power takeoff shaft of a conventional tractor.

From the preceding paragraphs, it will be noted that my novel transmission system, while being of simple and inexpensive construction functions in a more efficient manner than any heretofore known comparable system.

It will, of course, be understood that various changes may be made in the form, details, arrangement and proportions of the various parts without departing from the scope of my invention.

What is claimed is:

1. In a driven implement having a plurality of driven components mounted on a wheeled frame and being powered by the power takeoff of a tractor, first and second elongate driven input shafts mounted in side-by-side relation in substantially parallel relation on the implement frame and extending in a fore and aft direction thereon, each of said driven input shafts having a forward splined end, the splines on said first input shaft corresponding to the power takeoff output shaft of a conventional tractor which revolves at a predetermined r.p.m., and the splines on said second input shaft corresponding to the power takeoff output shaft of a conventional tractor which revolves at a greater r.p.m. than the r.p.m. of the first mentioned output shaft of the tractor, means drivingly interconnecting said shafts whereby said shafts will be simultaneously driven but at different speeds, drive mechanism drivingly connecting said first input driven shaft with said driven components, an elongate power takeoff transmission shaft having a pair of splined sockets each mounted at one end thereof, the splines on one of said sockets corresponding to the splines on said first driven input shaft for mating engagement therewith, and the splines of said other socket corresponding to the splines on said second driven input shaft, whereby said power takeoff transmission shaft may be drivingly interconnected with said first input driven shaft and the faster driven power takeoff output shaft of a tractor, and upon turning end for end may be selectively interconnected with said second input shaft and the slower driven power takeoff output shaft of a conventional tractor.

2. The invention as defined in claim 1 wherein said first input driven shaft is revolved at approximately twice the speed of said second input driven shaft.

3. The invention as defined in claim 1 wherein said drive connection between said input shafts comprises a chain and sprocket drive.

4. The invention as defined in claim 1 wherein the number of splines on said second input shaft is substantially greater than the number of splines on said first input driven shaft.

References Cited

UNITED STATES PATENTS

| | | | |
|---|---|---|---|
| 2,975,643 | 3/1961 | Ferguson | 74—15.2 |
| 3,001,409 | 9/1961 | Fumetti | 74—11 |
| 3,002,393 | 10/1961 | Browning | 74—11 |
| 3,007,297 | 11/1961 | Halls et al. | 74—11 X |
| 3,059,505 | 10/1962 | Reicks | 74—11 X |

FRED C. MATTERN, JR., *Primary Examiner.*

LEONARD H. GERIN, *Examiner.*